United States Patent [19]

Rode

[11] 4,214,465
[45] Jul. 29, 1980

[54] TOLERANCE COMPENSATING DEFORMING PRESS

[75] Inventor: John E. Rode, Fonda, N.Y.

[73] Assignee: Temper Corporation, Fonda, N.Y.

[21] Appl. No.: 854,484

[22] Filed: Nov. 25, 1977

[51] Int. Cl.² .................................. B21B 31/34
[52] U.S. Cl. .................................. 72/36; 29/445;
29/454; 72/446; 72/470; 72/DIG. 15; 33/143
H; 33/174 H; 100/257
[58] Field of Search ............ 29/454, 404, 445, 283.5,
29/252, 238; 33/143 H, 143 R, 174 H; 72/DIG.
15, DIG. 21, 470, 36, 413, 416, 441; 100/257

[56] References Cited
U.S. PATENT DOCUMENTS

| | | | |
|---|---|---|---|
| 1,890,077 | 12/1932 | Elting | 72/DIG. 15 UX |
| 2,522,439 | 9/1950 | Feurer | 29/445 X |
| 2,595,036 | 4/1952 | Wolcott | 33/143 R X |
| 2,726,707 | 12/1955 | Wellons et al. | 100/257 UX |
| 2,742,948 | 4/1956 | Baird | 29/445 X |
| 2,938,232 | 5/1960 | Martin | 100/257 UX |
| 3,318,235 | 5/1967 | Hanni | 72/441 X |
| 3,333,447 | 8/1967 | Alspaugh | 100/257 UX |
| 3,378,905 | 4/1968 | Szohatzky | 29/283.5 X |

*Primary Examiner*—Charlie T. Moon
*Attorney, Agent, or Firm*—Albert L. Jeffers; Roger M. Rickert

[57] ABSTRACT

A plastic deformation is imparted to each of a sequence of load determining elements with the amount of deformation matching each element to a corresponding one of a sequence of element receiving workpieces to compensate for dimensional variation between the workpieces. A first fixture portion is abutted to a first workpiece portion and a second fixture portion is abutted to a second workpiece portion to provide a dimension defining separation between the fixture portions which is a function of a variable dimension of the abutted workpiece. The load determining or spacing element is then deformed the amount required for the particular abutted workpiece and the sequence of steps repeated to provide a plurality of matched elements and workpieces. The amount of element deformation may be such that the elements are under a like compression when assembled in each workpiece, thereby preloading the workpieces by consistent amounts or the deformation of the load determining elements may be sufficient that each workpiece has a small amount of free movement after assembly of the elements within the workpieces.

6 Claims, 8 Drawing Figures

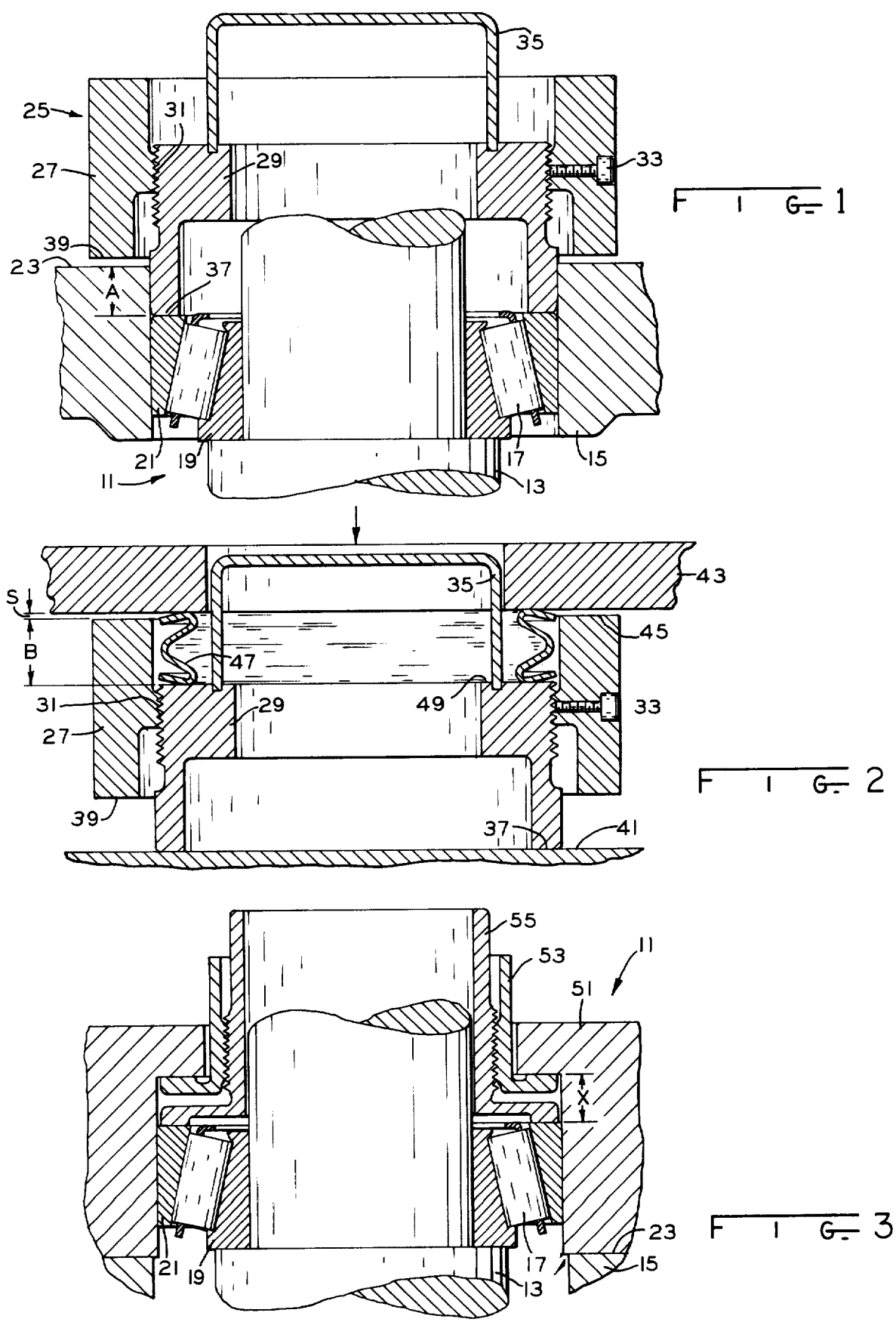

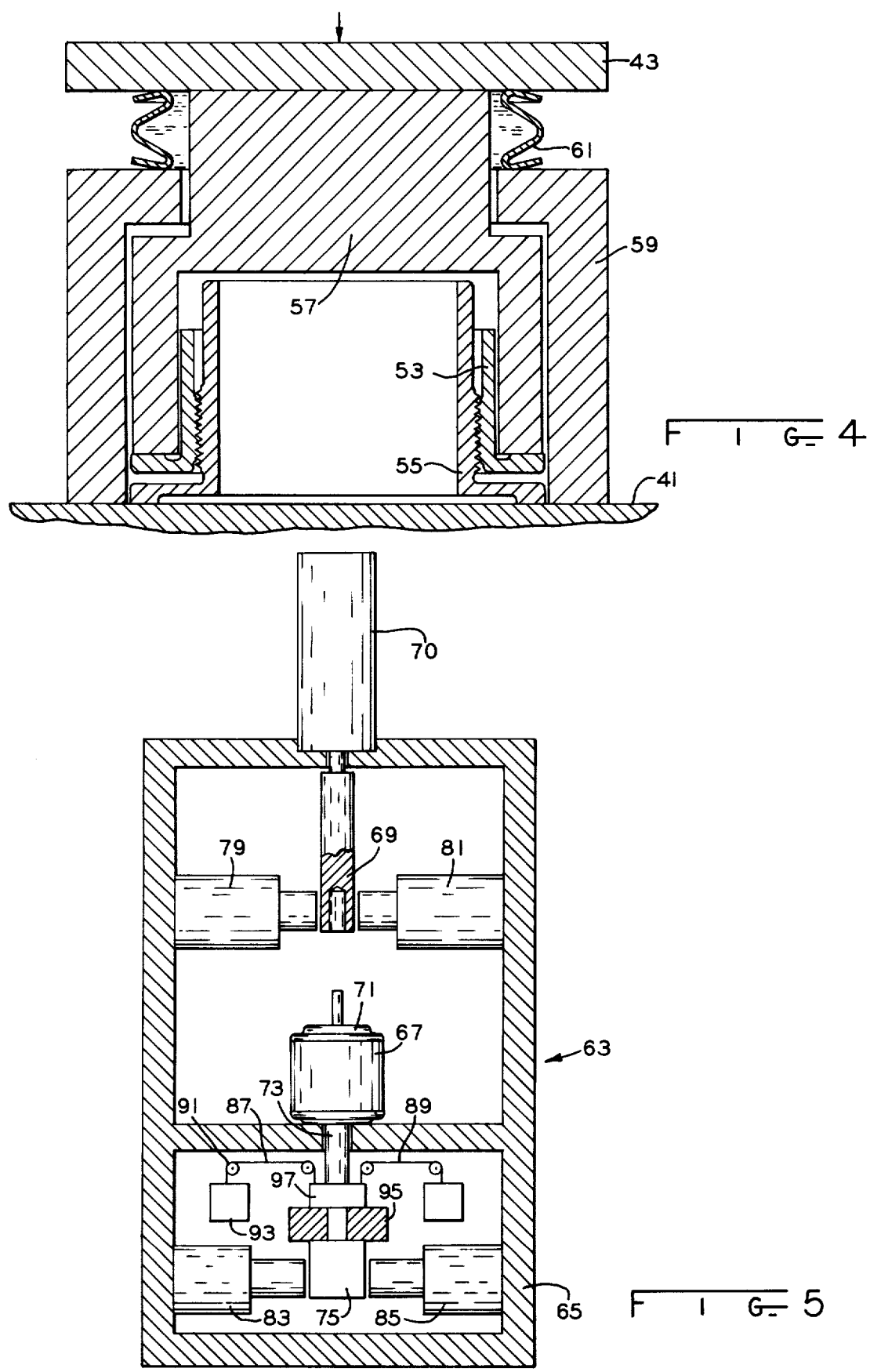

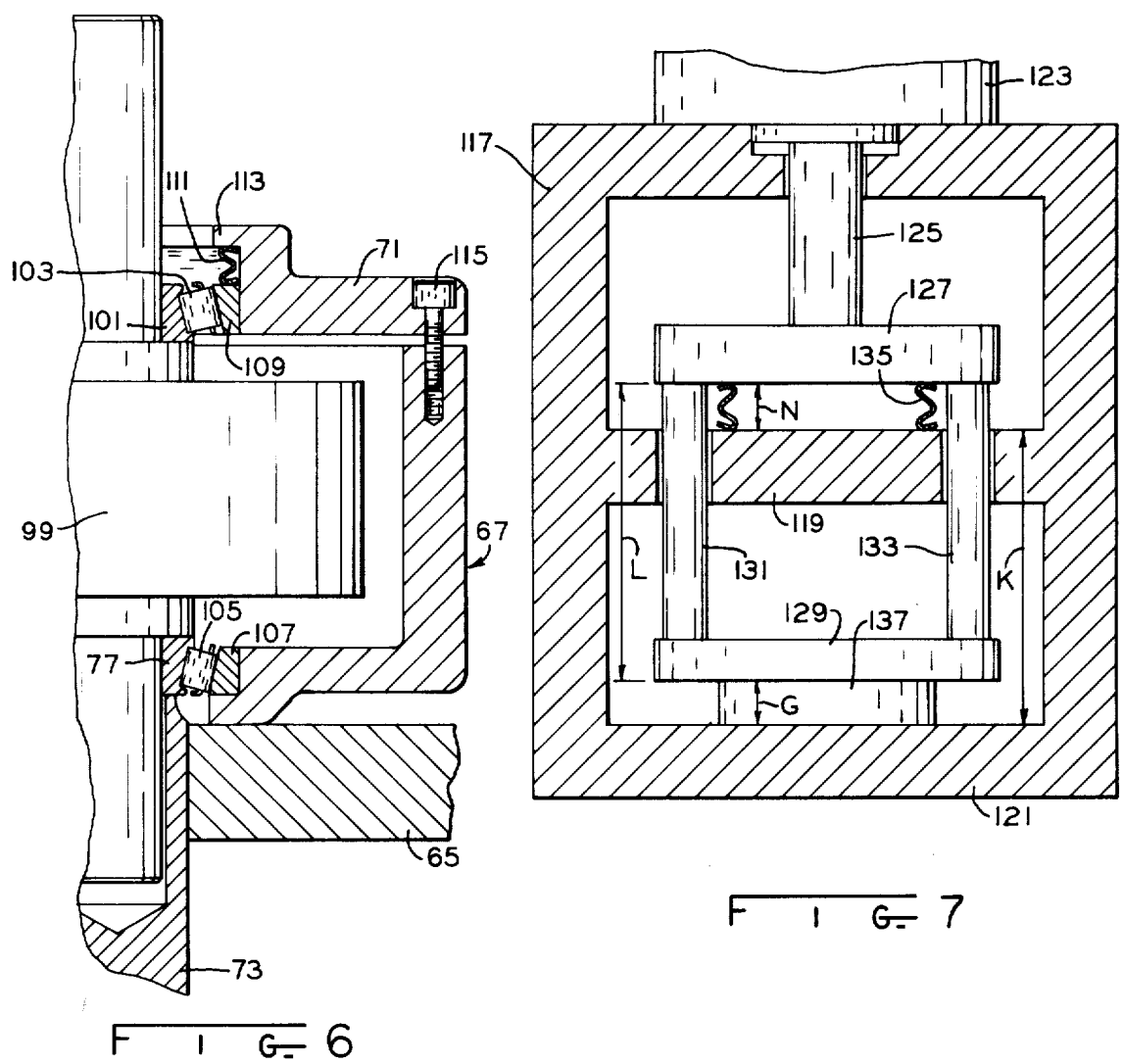
FIG. 6
FIG. 7
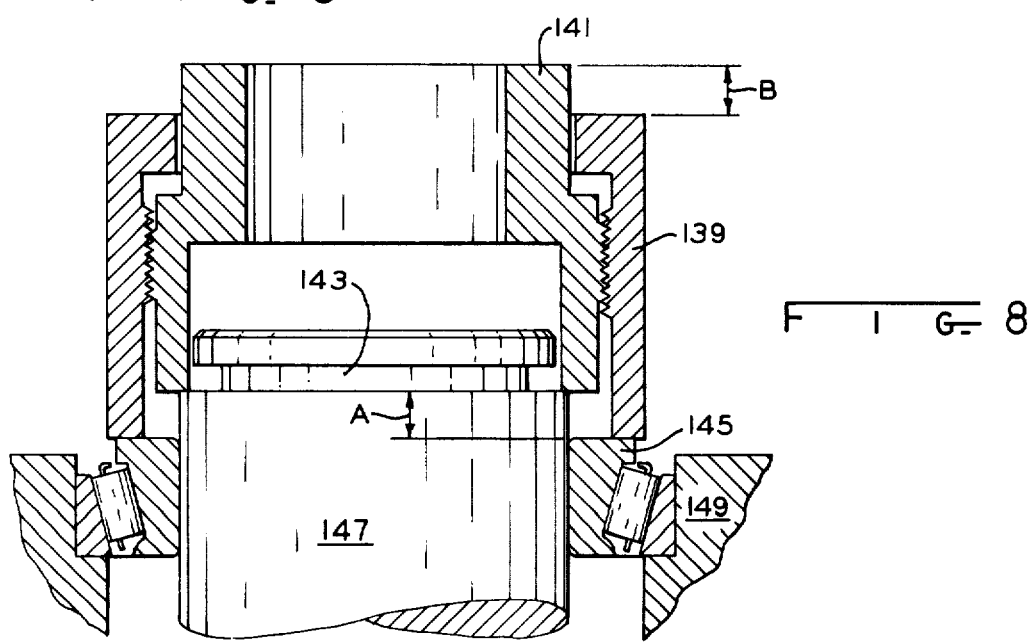
FIG. 8

TOLERANCE COMPENSATING DEFORMING PRESS

BACKGROUND OF THE INVENTION

The assembly of workpieces, such as machinery having rotating parts, frequently requires the precise fitting of antifriction rolling elements such as ball or roller bearings. Tolerances of the manufactured workpiece parts may cause variations in the axial dimensions of the workpiece which may exceed allowable variations for the fitting of bearings therein and therefore often some method of selective fitting or tailoring of a compensating component is required. One method commonly employed is to measure the assembly of components and provide a shim or spacer selected to precisely obtain the desired fit, which may be either a small amount of free end play or clearance or some prescribed value of a preloading force on the assembly.

An early example of an arrangement for preloading ball bearing arrangements in a workpiece is illustrated by U.S. Pat. No. 2,101,130 to Christman. The Christman arrangement provides a deformable or crushable separator element between ball bearing races so that in the assembly of the parts, this separator may compensate for inaccuracies of the workpiece parts. Christman employs a press to deform his spaceing element to a preferred load, whereupon the workpiece parts are crimped or otherwise permanently fastened in position. In other words, Christman relatively moves his workpiece parts until a certain preload force is achieved, whereupon the parts are permanently affixed to complete the workpiece assembly.

Improvements on the spacer or similar sealing elements, over known types such as employed in the Christman device are clearly described in my U.S. Pat. Nos. 3,561,793, 3,595,588, 3,751,048, 3,774,896, 3,794,311 and 3,900,232, as well as my two copending Applications, U.S. Ser. Nos. 447,571, now Pat. No. 4,067,585, and 838,306, now U.S. Pat. No. 4,125,929 filed Mar. 4, 1974 and Sept. 30, 1977, respectively, and U.S. Pat. Nos. 3,726,576 and 3,672,019. Briefly, my improved annular spacing elements are designed to experience elastic deformation with a relatively linear stress-strain relationship followed by plastic deformation under a relatively constant load or force, and when the originally applied deforming force is removed, they again exhibit a relatively linear stress-strain relationship, displaced by the amount of plastic deformation from their original stress-strain relationship. Thus, attempting to apply directly the Christman compensating technique to my spacer or load determining elements would result in either no plastic deformation of my elements, or a complete crushing of my elements. This is due to the fact that Christman increases the compressing force until a prescribed value is achieved, whereupon he fastens his workpiece portions together in that position and under that prescribed load. This approach worked for the Christman arrangement since the Christman spacer element was essentially an annular spring. Further, Christman preloads bearings to a prescribed pressure by allowing for variations in the relative position between two housing portions when those housing portions are affixed together. Such variations in the relative position of the housing portions are the exception rather than the rule in modern day equipment where typically two housing portions are bolted or welded together at their meeting faces, rather than one portion being press-fit into another portion to a variable depth. Thus, the Christman arrangement is unsuited to most bearing spacing or loading problems.

SUMMARY OF THE INVENTION

Among the several objects of the present invention may be noted the provision of a method of and apparatus for deforming a spacer element to adapt that element to a specific workpiece so that dimensional tolerances of a workpiece (variations in the dimensions of different workpieces) are compensated for by the amount of deformation of the spacer element; the provision of a methd and apparatus for deforming a spacer element by an amount tailored to a particular workpiece prior to assembling that spacer element in that workpiece; the provision of a method and apparatus for deforming a spacer element by an amount particularly suited to a particular workpiece in which the spacer element is disposed; the provision of an arrangement for adjusting bearings to close tolerances in a high production environment; the provision of an arrangement for adjusting bearings and in particular a compensating element for those bearings not requiring the assembly, disassembly and reassembly of the bearing arrangement; the provision of a system for rapidly and economically assembling a workpiece and compensating that workpiece for dimension variations therein; and the provision of a unique method and apparatus for imparting a plastic deformation to a spacer element with the amount of deformation adapting that element to a particular workpiece. These as well as other objects and advantageous features of the present invention will be in part apparent and in part pointed out hereinafter.

In general, one housing portion of a workpiece has a shaft, bearings, bearing races and an annular spacing element loosely placed therein in the same relative positions as those parts to occupy in the finished workpiece, and another housing portion assembled to the first housing portion to axially compress the spacing element. After the housing portions are assembled, the spacing element is further axially compressed a predetermined amount which additional compressing is independent of the amount of axial compression experienced when the two housing portions were assembled.

Also in general and in one form of the invention, a shaft, bearings, bearing races and an annular spacing element are placed within a portion of a workpiece housing in the same relative positions as they are to occupy in the finished workpiece. A first portion of an adjusting fixture is then abutted with a first portion of the workpiece, and a second portion of the adjusting fixture and a second portion of the workpiece are thereafter abutted with the fixture portion continuing to abut the first workpiece portion, so that the relative positioning of the two fixture portions indicates the relative positioning of the first and second workpiece portions. The fixture is then removed from abutment with the workpiece portions, while the relative positioning of the two fixture portions is maintained and a spacing element is deformed by an amount determined by the relative positioning of those fixture portions. The thus deformed spacing element may then be placed in contact with one of the previously abutted workpiece portions and engaged and confined within the workpiece housing by the juxtaposition and fastening together of the housing portions.

FIG. 1 is a section view of a portion of an illustrative workpiece partly assembled and engaged by a deformation determining fixture;

FIG. 2 is a section view illustrating a spacer element being deformed in the fixture of FIG. 1;

FIG. 3 is a view similar to FIG. 1 but illustrating a somewhat different fixture;

FIG. 4 is a view similar to FIG. 3 illustrating deformation of a spacing element employing the fixture of FIG. 3;

FIG. 5 is a section view of a press arrangement having fixtures for engaging a nearly completely assembled workpiece and for deforming a spacer element therein;

FIG. 6 is a section of the workpiece and portions of the press illustrated in FIG. 5;

FIG. 7 illustrates another press arrangement for external spacer height adjustment; and FIG. 8 illustrates a further variation on the fixture and workpiece of FIGS. 1 and 2.

Corresponding reference characters indicate corresponding parts throughout the several views of the drawing.

The exemplifications set out herein illustrate a preferred embodiment of the invention and such exemplifications are not to be construed as limiting the scope of the disclosure or the scope of the invention in any manner.

DESCRIPTION OF THE PREFERRED EMBODIMENTS

In FIG. 1, a workpiece 11 may be any of a broad class of manufactured items, such as a speed reducer, pump or motor, and includes a shaft 13 journaled within a housing 15 by tapered roller bearings 17 disposed between an inner race 19 and an outer race 21. Workpiece 11 may, of course, have a similar bearing arrangement (now shown) but located near an opposite end thereof. The workpiece housing 15 will, when completed, include another housing portion (not shown) but mating with the surface 23 of the housing portion illustrated. This other housing portion will typically fit rather closely about the shaft 13 and when the workpiece is ultimately assembled, a spacer element will be disposed between this other housing portion and the bearing race 21 to hold the bearings, bearing races and shaft in position under either a prescribed load or with a prescribed amount of end play. To provide an annular spacer element of the proper axial length to fit between the bearing race 21 and the housing portion, the fixture 25 may be used.

Fixture 25 includes a first fixture portion 27 and a second fixture portion 29, both of a generally annular configuraton, telescoped together and in adjustable threaded engagement at 31. The threaded engagement 31 provides relative axial displacement between the fixture portions 27 and 29 when one of those portions is rotated relative to the other. A set screw 33 may be provided to fix the relative axial displacement of the portions 27 and 29 as desired, and an optional handle 35 for lifting fixture 25 is also illustrated In use, the fixture portion end 37 is engaged with a workpiece part, such as bearing race 21, and fixture portions 27 and 29 relatively rotated until the end 39 of fixture portion 27 abuts the surface 23 of the workpiece 11, thus the distance between end 37 and end 39 is the dimension A which will vary for different workpieces due to the accumulated dimensional tolerances in the workpieces. Set screw 33 may now be tightened if desired to lock the two fixture portions 27 and 29 together, and the entire fixture 25 is removed from the workpiece and transferred to the press arrangement illustrated in FIG. 2. A further modification of the arrangement of FIG. 1 may be desirable for assemblies which require substantial force to be applied at the interface of fixture surface 37 and workpiece 21 so that looseness of the component workpieces is completely eliminated within workpiece 11. This may be accomplished by securing handle 35 to the housing part 23 or by application of external force to handle 35 as by spring loading. The rotation of the shaft parts within workpiece 11 may be required to assure that the component workpieces are in proper engagement before proceeding with the adjustment of fixture portion 27.

The press of FIG. 2 may be any suitable press arrangement for urging press ram 43 toward and away from press bed 41. For example, for small spacer elements a conventional hand-actuated arbor or mandrel press may be employed. Fixture 25 is placed on press bed 41 with the end 37 engaging the press bed 41. Press ram 43 is lowered until it contacts the end 45 of fixture portion 27. A spacer element 47 is disposed between the upper end 49 of fixture portion 29 and the ram 43 so that actuation of the press compresses or deforms the spacer element 47 to the axial dimension between ends 45 and 49, plus of course the axial elastic restoration which occurs when the press ram 43 is raised. Dimension B of FIG. 2, which is the axial length to which the spacer element 47 is compressed, is of course, related to dimension A, as measured in FIG. 1, and being in FIG. 2 the distance between end 39 of fixture portion 27 and the press bed 41 plus the axial length of fixture portion 27 minus the axial length of fixture portion 29. The spring back distance S for the particular spacer element 47 may for example be determined and/or controlled in accordance with the techniques set forth in my aforementioned copending applications, and hence the tailoring of the deformed spacer element 47 to the particular workpiece 11 is uniquely determined by the relative lengths of the fixture portions 27 and 29, and compensates for variations in dimension A for various workpieces in a relatively simple manner.

Whether the spacing element 47 imparts a load on the bearings of the finished workpiece, provides a slight axial spacing for the bearings or "just fits", the bearings within the workpiece is of course a matter of how much deformation is imparted to the spacer element 47, and the loading or spacing provided thereby is intended to be encompassed by either term. For example, to provide the "just right" spacing or loading of the workpiece bearings, dimension A and dimension B plus S should be identical, which in turn means that the amount of spring back S for the particular spacer element 47 should equal the axial length of fixture portion 29 minus the axial length of fixture portion 27. By the proper choice of the relative axial lengths of these fixture portions, any desired spacing or preload is achievable. It should now be apparent that the press of FIG. 2 must have sufficient capacity to impart the necessary force to permanently deform the spacer 47 and that any excess of force above that required will be sustained by the related engagement between the fixture pieces 27 and 29. Said fixture parts are usually made from strong metals such as steel and, therefore, allow a large excess of force to be applied without damage to the fixture. The related engagements obviously must be accurately made so that no looseness will be present to cause inaccuracy relating dimension B to dimension A, otherwise the axial looseness of said related engagement can be accounted for by a corresponding decrease in the axial length of fixture piece 29.

In discussing the fixture arrangement of FIGS. 1 and 2, it was assumed that all of the significant or troublesome dimensional variations from part to part were accumulated in the dimension A, however, for some workpieces, the housing portion not illustrated in FIG. 1, which mates with surface 23, may itself include significant tolerances. Further, for certain workpieces, direct access to the end bearing as depicted in FIG. 1 may be inconvenient and accordingly the modified fixture illustrated in FIGS. 3 and 4 may better suit certain workpiece environments.

In FIG. 3, the workpiece 11 of FIG. 3 is for illustrative purposes assumed to be subtantially like that illustrated in FIG. 1, with a housing portion 15 containing a shaft 13, tapered roller bearing 17, outer bearing race 21 and inner bearing race 19 substantially as previously described. The workpiece 11 further has mated to surface 23 a second housing portion 51, which is for example, a cover, end bell or other typically encountered workpiece housing part. The axial space into which the spacer element will ultimately be put is represented in FIG. 3 by the dimension X and may be measured by relatively rotating the threaded adjusting collars or fixture portions 53 and 55 until the upper surface fixture portion 53 engages the lip on the cover 51, and the lower end of fixture portion 55 engages the outer race 21, against which the spacer element will ultimately be placed. The force of said engagement may be selected according to the desired rolling resistance which is imparted to shaft workpiece 13 and thus assuring that all looseness of component workpieces is eliminated. The cover 51 may then be removed and the fixture portions 53 and 55 withdrawn therefrom and transferred to the press arrangement of FIG. 4 for forming the space element.

The press of FIG. 4 is, like the FIG. 2 press, any convenient conventional arrangement for forcing a ram 43 toward and away from a press bed 41. The dimension defining fixture portions 53 and 55, having measured dimension X in FIG. 3, are prevented from easily relatively rotating, thereby losing that dimension, again by a set screw arrangement as illustrated in FIG. 1, by a further locking ring independently threaded to one of the fixture portions, or by any other convenient arrangement to insure that the dimension is not lost during process. Fixture portion 55 is disposed on the press bed 41 and a pedestal 57 is placed on top of the two fixture portions so that the lowermost portion of pedestal 57 resides on the fixture portion 53. Thus, pedestal 57 is displaced upwardly from the press bed by dimension X. A further pedestal portion 59 is placed over the arrangement and resting on press bed 41, which further pedestal portion 59 supports a spacer element 61 to be deformed. Press ram 43 may then be lowered, deforming the spacer element 61 until the ram 43 engages pedestal portion 57, stopping the ram and indicating completion of the deformation process. If the axial length of the pedestal portions 57 and 59 are identical, the spacer element 61 will be compressed to the dimension X and will after deformation be of an axial length or height equal to the dimension X plus any resilient spring back distance for the particular spacer element. As a further example, if the spacer element 61 is to be designed to just fit the dimension X of the workpiece, pedestal 57 would be shorter than pedestal 59 by this spring back or resilient restoration distance for the spacing element 61.

As thus far discussed, deformation of the spacing element occurs outside the workpiece and after deformation that spacing element is assembled into the workpiece, however, it is also possible to deform the spacing element while it is in the workpiece and without the prior art problem of a partial disassembly and reassembly of that workpiece after deformation. Such an in place forming of a spacing element to an optimum height for a particular workpiece may be achieved by the press 63 of FIG. 5. Press 63 includes a press frame 65 for supporting workpiece 67 and a first press ram 69 actuable by hydraulic or pneumatic cylinder 70 to move downwardly and into engagement with the top or cover 71 of workpiece 67 to force that workpiece against the press frame 65. A second press ram 73 actuable by a further hydraulic automatic cylinder 75 may be moved upwardly and into engagement with a part of the workpiece which is distinct from those engaged by the ram 69 and frame 65, such as, for example, the inner bearing race 77 of FIG. 6.

After ram 69 has firmly seated the workpiece cover 71 to the workpiece 67, that ram is fixed in its location either by the continued energization of the cylinder 70 or by actuating cylinders, such as 79 and 81, the pistons of which serve to anchor the ram 69 in position. Similar hydraulic or pneumatic cylinders 83 and 85 are provided to anchor the actuating cylinder 75 in a variable position determined by the particular workpiece 67.

When the workpiece is initially placed on press frame or bed 65, ram 73 engages a part of that workpiece. Ram 73 and its actuating cylinder 75 are suspended in a somewhat "free floating" manner by cables, such as 87 and 89, passing over an arrangement of pulleys, such as 91 and connecting to a series of weights, such as 93. The total weight of the weights, such as 93, is slightly greater than the total weight of ram 73, along with its actuating cylinder 75 and related parts so that this ram and actuating cylinder extend up through the press bed and engage the workpiece before that workpiece is firmly seated on the press bed. The weight of the workpiece overbalances this arrangement so that the weights 93 raise, and the ram 73 and actuating cylinder 75 are lowered as the workpiece is lowered into its rest position on the press frame 65. When the ram 73, which engages, for example, the inner bearing race 77 of the workpiece, has been moved to its proper position relative to that particular workpiece, cylinders 83 and 85 are actuated to anchor the ram actuating cylinder 75 in that position.

Between the cylinder 75 and ram 73 is a spacer 95 which has been selected for a particular run of workpieces and which limits the retraction of ram 73 toward cylinder 75 by seating against cylinder 75 and the enlargement 97 on ram 73, respectively, when that ram is retracted toward the cylinder. Thus, for a given spacer 95, ram 73 is movable by cylinder 75 from a retracted position determined by the spacer to its most extended position with this length of potential travel being set by the spacer for a given run of workpieces to impart a fixed deformation to each of a series of spacing rings in each of a series of workpieces. When the workpiece 67 is seated on press bed 65 and the weights 93 raised by depression of the ram 73, shoulder 97, spacer 95 and cylinder 75, that cylinder 75 is clamped or anchored in position by the cylinders 83 and 85 to thereafter provide a fixed amount of upward movement of the ram upon actuation of the cylinder.

Considering now FIG. 6, and recalling that ram 73 will provide a fixed amount of upward travel when its cylinder is actuated, the assembly and sequence of events prior to this "finishing touch" deformation will be considered. Workpiece 67 has a housing or cover portion 71 which is forced into firm engagement with the other housing portion of the workpiece by depression of the ram 69. Within the housing 67 will be found a shaft and rotating assembly 99, for example a shaft with a gear, motor rotor, pump impeller or other typically encountered workpiece parts associated therewith. The shaft includes inner bearing races 77 and 101 and tapered roller bearings 103 and 105, which respectively engage outer bearing races 107 and 109 in the workpiece housing. A compressible spacing element or load ring 111 is disposed between the upper outer bearing race and a flange or lip 113 on the housing portion 71. Actuation of ram 69 depresses the cover or housing portion 71 into engagement with the remaining housing portion and compresses the spacer element 111 by a variable amount depending upon the dimensional tolerances or variations from workpiece to workpiece. When the housing portion 71 is in place, it may, for example, be attached by volts, such as 115, to complete the housing assembly. After the housing portion 71 is in position and the spacing element 111 is deformed by an amount particular to the individual workpiece, ram 73 is actuated to further compress the spacing element 111 by an amount calculated to yield the appropriate end play in the finished workpiece or the appropriate bearing loading force in that particular workpiece as desired. Thus, a prescribed loading by the spacer ring 111 determined by the fixed stroke of the ram 73 is provided wth the previous compressing of spacer element 111 by ram 69 compressing the housing cover against the press frame, having been a variable amount of deformation to compensate for the dimensional tolerances in the workpiece.

In FIG. 7, a generally H-shaped press frame 117 includes an upper press bed portion 119 and a lower press bed portion 121. A hydraulic cylinder 123 is secured to the top of the frame 117 and has a cylinder rod 125 extending downwardly therefrom connecting to a movable plate 127. This plate 127 is in turn rigidly connected to a lower movable plate 129 by rods 131 and 133, which pass through the central frame portion or upper bed portion 119. An annular spacing element 135 is placed, for example, on bed portion 119, while a gauge 137 is placed on bed portion 121. Clearly, the gauge 137 and spacing element 135 could be interchanged if desired. As illustrated then the gauge 137 limits the downward travel of the press ram and since the ram portions are rigidly tied together, this limits the compressing of the spacing element 135 to a precisely determined height, depending upon the height of the gauge element 137 as well as the relative spacing between the bed portions (K) and the relative spacing between the ram portions (L).

If the crushed or maximum deformation height of the spacing element is H, as illustrated in FIG. 7, namely the distance between the lower surface of ram portion 127 and the upper surface of bed portion 119, and further if the height of the gauge (G) is the separation between the upper surface of the lower bed portion 121 and the lower surface of ram portion 129, then L plus G equals K plus H. If G is preset to occupy the end space in a bearing assembly and further if it is desired that the bearings in that assembly having a running axial clearance of, for example, 0.003 inches, and the resilient springback of the spacing element 135, which might for example be around 0.008 inches is known, then the press frame dimensioning may be completely determined. Thus, if the height K is 2.600 inches, then the press ram portions are separated by dimension L, which is made equal to 2.600 minus 0.003 minus 0.008 or 2.589 inches. With these press dimensions and the height G determined for each workpiece, each resulting spacer ring will have the desired running clearance of 0.003 inches.

The lower ram portion 129 may be annular, that is cut out in the center to accept a fixture such as the fixture 53, 55 of FIGS. 3 and 4, or other gauging arrangements suitable to the particular workpiece involved may be employed.

In FIG. 8, a fixture 139, 141 which might form the gauging element 137 in the press of FIG. 7 is shown in conjunction with a slightly different workpiece to further illustrate applications of the present invention. In FIG. 8, a workpiece in a partially assembled state will accept a spacer to fill dimension A, and a snap ring in the shaft groove 143 to retain bearing race 145, and the other workpiece components within the workpiece. Such an assembly where the tapered roller bearing back faces adre positioned outermost to the assembly is frequently encountered in situations where the shaft 147 is stationary and the outer structure 149 rotates, as for example in some pulley clutch designs or roller assemblies.

The fixture 139, 141 will be employed in a press, such as illustrated in FIG. 2 to deform the spacing ring and is set to its desired height by engaging fixture portion 139 with the outer surface or cone back face of inner race 145. The telescoped members 139 and 141 are relatively rotated until the inner fixture portion 141 contacts the surface on shaft 147 on which the snap ring will ultimately rest. The sequence of engaging the two fixture portions to the workpiece is of course immaterial and once both portions engage their corresponding workpiece portions, the fixture dimension B determines the height to which the spacer ring will be compressed by the press of FIG. 2, while the overall length of the two fixture portions 139 and 141 determines the compression imparted by a press, such as illustrated in FIG. 7.

For example, dimension B would equal dimension A less the spacer ring springback dimension plus the clearance, if any, of the snap ring in groove 143, less the desired amount of end play in the finished product, if any.

Shaft 147 has a shoulder against which fixture portion 141 may be easily abutted, however, for some workpieces the diameter of shaft 147 on either side of the snap ring groove may be the same, in which case the snap ring may be assembled on the shaft before the gauging fixture is set, in which case the gauging fixture may be as illustrated in FIG. 8, with gauging portion 141 engaging the snap ring and appropriate dimensional changes made to compensate for the thickness of that snap ring. Assembly of the workpiece would then be completed by removing the snap ring, placing a deformed spacer over shaft 147 and replacing the snap ring.

A further advantage lies in the press adjustments of FIGS. 2, 4 and 7 wherein the spacers 47, 66 or 135 respectively may be sufficiently strong so as to make compression within a housing assembly impractical because of limitations in the load carrying ability of the housing parts for workpieces therein.

From the foregoing it is now apparent that a novel fixture arrangement and press as well as a novel process for forming an annular spacing element in a workpiece to an optimum height for that workpiece has been disclosed meeting the objects and advantageous features set out hereinbefore before as well as others and that modifications as to the precise configurations, shapes and details, as well as the precise steps of the method may be made by those having ordinary skill in the art without departing from the spirit of the invention or the scope thereof as set out by the claims which follow.

What is claimed is:

1. A press for forming an annular spacing element in a workpiece to an optimum height for that workpiece including a press frame for supporting the workpiece, a first press ram engageable with the workpiece to force the workpiece against the press frame, a second press ram engageable with a part of the workpiece distinct from the workpiece portions engaged by the press frame and first press ram, the annular spacing element being disposed between the distinct workpiece part and a workpiece portion engaged by at least one of the press frame and first press ram, and means for moving the second press ram to deform the annular spacing element.

2. The press of claim 1 wherein the workpiece comprises assemblable housing portions having a shaft journalable therein, actuation of the first press ram forcing the housing portions into their assembled position and compressing the spacing element a first distance.

3. The press of claim 2 wherein actuation of the second press ram deforms the spacing element a second fixed distance if such actuation occurs subsequent to actuation of the first press ram for a given workpiece.

4. The press of claim 3 wherein the first distance varies with dimensional variations between different workpieces while the second fixed distance is independent of those dimensional variations.

5. The press of claim 1 wherein the second press ram and the means for moving the second press ram are movably supported for movement to a reference position by and relative to the placement of a workpiece in the press.

6. The press of claim 5 further comprising means for anchoring the second press ram and means for moving the second press ram in the reference position prior to moving the second press ram to deform a particular annular spacing element.

* * * * *